Patented Nov. 10, 1953

2,658,916

UNITED STATES PATENT OFFICE 2,658,916

PREPARATION AND PURIFICATION OF HIGHER ALKYL ARYL SULFONAMIDES AND THEIR SALTS

Irving Joseph Krems, Bronx, N. Y., assignor to Colgate-Palmolive-Peet Company, Jersey City, N. J., a corporation of Delaware No Drawing. Application June 10, 1950, Serial No. 167,489

5 Claims. (Cl. 260—556)

The present invention relates to higher alkyl aryl sulfonamide type compounds and their preparation in purified form.

Aliphatic and simple aromatic sulfonamide compounds are well known in the art and have a variety of uses. Recent developments, however, have led to the preparation of higher alkyl aromatic sulfonamide compounds and their utilization in a number of unique relationships. Such advances in the art have brought to the foreground the unique character of higher alkyl substituted aromatic sulfonamide compounds, and the consequent desirability of their preparation in a substantially pure state.

It has now been discovered that higher alkyl substituted aryl sulfonamide compounds having a reactive hydrogen attached to the nitrogen atom may be treated in the liquid phase with an alkaline metal base to substantially convert said sulfonamide compounds to the corresponding alkaline metal sulfonamide salts, which are separated from the resulting liquid reaction mixture in purified form. A feature of the present invention comprises treating in an aqueous system such sulfonamide compounds with an excess of an alkaline metal base, the alkalinity of the resulting reaction mixture being effective to insure substantial formation of the corresponding alkaline metal salts of the sulfonamide compounds, said salts being characterized by their insolubility in the excess base, and separating said sulfonamide salts therefrom.

The sulfonamide salts obtained thereby are the alkaline metal salts of the higher alkyl substituted aromatic sulfonamide compounds. By the term "alkaline metal," it is intended to include the alkali metals, e. g. sodium, potassium, etc., and the alkaline earth metals, e. g. barium, calcium, etc. More particularly, these compounds may be selected from the group consisting of the alkali metal and alkaline earth metal salts of higher alkyl substituted aromatic primary sulfonamide and N-lower alkyl sulfonamide compounds. Illustratively, the alkali metal salts may be represented by the formula:

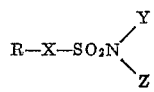

wherein R is a higher alkyl group, X is an aromatic radical, Y is a member of the group consisting of hydrogen and lower alkyl groups, and Z is an alkali metal salt-forming cation, preferably sodium or potassium. In general, the salts have a pH in aqueous solution of at least about 10, and are characterized by their insolubility in alkali.

An important embodiment of the present invention resides in the separation of the sulfonamides in a substantially pure state from undesirable impurities derived from the preparation of the sulfonamides by particular processing techniques. Thus, the higher alkyl substituted aryl sulfonamide compounds in substantially pure form may be prepared by condensing the higher alkyl substituted aryl sulfonyl halide with a member of the group consisting of ammonia and lower alkyl primary amines to form a reaction mixture comprising a sulfonamide compound from the group consisting of the corresponding primary sulfonamides and N-lower alkyl substituted sulfonamides admixed with undesirable impurities, treating said reaction mixture with a base to form the salt of the said sulfonamide compound, and separating the same from undesirable impurities. If desired, the sulfonamide salts, however derived, may be reconverted to the original sulfonamide compounds by treatment with a more acidic material.

The sulfonamide compounds suitable for purification and salt formation are characterized by their weakly polar nature, the presence of a higher alkyl aryl structure, and a sulfonamide function having a reactive hydrogen atom. More particularly, these compounds may be represented by the formula:

wherein R is a higher alkyl group, X is an aromatic radical, and Y is selected from the group consisting of hydrogen and lower alkyl groups having preferably about 1 to about 5 carbon atoms. The alkyl substituent on the aromatic nucleus preferably contains from about 10 to about 22 carbon atoms and may be branched or straight-chain in structure; it comprises moreover such groups as decyl, dodecyl, keryl, pentadecyl, hexadecyl, mixed long-chain alkyls derived from long-chain fatty materials, cracked paraffin wax olefins, polymers of lower mono-olefins, etc. It is preferred that the alkyl substituent average about 12 to about 18 carbon atoms. For example, propylene may be polymerized to the tetramer and condensed with benzene in the presence of an alkylation catalyst, e. g. a Friedel-Crafts catalyst, to yield a mixture comprising essentially the dodecyl benzene derivative which is suitable for preparation of the desired sulfonamide type compounds. The aromatic nucleus may have other substituents which do not interfere with the character of the purification process. Thus, a variety of suitable aromatic nuclei may be derived from benzene, naphthalene, toluene, xylene, etc.

Included within the ambit of the invention is the following preferred class of compounds suitable for purification which may be represented by the structural formula:

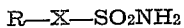

wherein R has the significance set forth above and X is a mono-nuclear aromatic radical. Suitable examples of such compounds are decyl benzene sulfonamide, dodecyl benzene sulfonamide, keryl benzene sulfonamide, dodecyl toluene sulfonamide, dodecyl benzene sulfonamide wherein the dodecyl group is derived from a propylene tetramer, pentadecyl benzene sulfonamide wherein the pentadecyl group is derived from a propylene pentamer, etc.

Other suitable compounds are the N-monosubstituted derivatives such as dodecyl benzene N-methyl sulfonamide, keryl benzene N-methyl sulfonamide, dodecyl benzene N-ethyl sulfonamide, dodecyl toluene N-methyl sulfonamide, dodecyl benzene N-propyl sulfonamide, dodecyl benzene N-butyl sulfonamide, etc.

These sulfonamide compounds may be prepared in any suitable manner. The modes of synthesis described below however are preferred and yield a reaction product capable of a high degree of purification by the purification techniques set forth herein. The higher alkyl substituted aromatic sulfonyl halides used as initial reactants may be prepared by treatment of the alkyl aryl compounds with a sulfonating agent, e. g. chlorosulfonic acid, oleum, sulfuric acid, sulfur trioxide, etc. With the use of chlorosulfonic acid on the alkyl aryl compounds the corresponding sulfonyl chloride is produced in a simple and practical manner. From the reaction of the alkyl aryl compounds with oleum and the like, the corresponding sulfonic acid is produced with facility. The sulfonyl chlorides may be produced therefrom by the direct action of phosphorous pentachloride on the salts of these sulfonic acids. In like manner and by known methods, other sulfonyl halides may be prepared, such as the sulfonyl bromide, fluoride, etc.

The higher alkyl aryl sulfonamides may be prepared by condensation in a non-acidic medium of the appropriate sulfonyl halide with the suitable amino compound, e. g. ammonia or lower amine, preferably under Schotten-Baumann reaction conditions. The ammonia is preferably employed in the liquid state, such as aqueous or liquid ammonia.

The condensation between the alkyl aryl sulphonyl halide (e. g. chloride, bromide) and the amino compounds may be effected under varying conditions. The reaction may be conducted by mixing suitable proportions of the initial reactants in an aqueous or mutual solvent (e. g. acetone) medium. In general, the reaction may be conducted by employing substantially stoichiometric ratios of the reactants. If necessary, an excess of the amino compound may be used rather than an excess of the sulfonyl compound since the latter condition would tend to yield undesirable by-products such as free alkyl aromatic sulfonic acids in aqueous media. Generally, no external heat need be applied; if desired, however, elevated temperatures up to the refluxing temperature of the mixtures and if necessary up to about 100° C. may be applied satisfactorily.

It is necessary to operate in a non-acidic medium since free acid would tend to form amine salts and thereby decrease the quantity of reactable amino compound, and consequently the yield of the condensation product. While a neutral or alkaline medium may be employed, it is preferred to use the latter. A neutral medium may be maintained by appropriate addition of alkali during the course of the reaction to neutralize liberated acid, e. g. hydrochloric acid, which is a product of the condensation reaction.

The crude reaction mixture resulting from the above condensation contains a number of undesirable impurities and by-products in addition to the desired sulfonamides. There is generally present minor amounts of unreacted alkyl aryl compounds, traces of sulfonates, split hydrocarbons, sulfones and possibly other substances.

The desired sulfonamides may be purified from the reaction mixture containing residual impurities in a simple and practical manner by conversion to a salt which is characterized by its insolubility in excess alkali and its separation from the reaction mixture as a solid phase. This purification process may be performed either by batch, semi-continuous or continuous operations.

Thus the reaction mixture is to be treated with an alkaline metal base effective to form the corresponding salts. In aqueous systems, the resulting alkaline reaction mixture should have a pH of at least above about 10 and preferably above about 11 to insure substantial salt formation. Thus alkaline metal bases having a pH in aqueous solution of generally at least about 10 and preferably at least about 11 are required usually. By the phrase "alkaline metal base," it is intended to include an alkali or alkaline earth metal or their electrolytes which are capable of furnishing hydroxyl ions in aqueous solution or electrons in non-aqueous systems, e. g. sodium hydroxide, potassium hydroxide, calcium hydroxide, barium hydroxide, sodium metal, calcium metal, sodium hydride, sodium carbonate-sodium hydroxide mix, etc. It is preferred to use the alkaline metal hydroxides and usually the alkali metal bases as the suitable bases because of their extreme alkalinity in solution and general avoidance of any possible side reactions by reason of their simple character. Optimum results are effected with the use of the caustic alkalis such as sodium and potassium hydroxide. The use of weaker bases, such as sodium bicarbonate, is included within the scope of the present invention since such substances may be added to the solution to furnish also the necessary amount of cation provided the final alkalinity of the solution is of an order consistent with desired salt formation and precipitation. Where the bases are utilized in aqueous solution form, either dilute or concentrated solutions may be used though it is preferred to use concentrated solutions, such as 20–25% caustic soda solution.

The reaction is preferably performed at normal room temperatures and the like. If desired, slightly elevated temperatures of the order of not substantially in excess of about 100° C. may be employed with certain advantages such as lowering of the viscosity of the reaction mixture, increasing the rate of reaction where desirable, and forming a more flocculent precipitate suitable for easier precipitation.

By such treatment, the sulfonamides having a reactive hydrogen attached to the nitrogen atom are converted to the corresponding alkaline metal salts. In aqueous systems, however, the reaction is one of reversible equilibrium. In order to precipitate the sulfonamide salts in substantially pure state, it is necessary to prevent any substantial reversal of the reaction.

The use of an excess of sulfonamide or generally equivalent amounts of reactants is usually unsatisfactory. By the latter procedures, hydrolysis of the sulfonamide salt products is a significant factor in aqueous systems. Any precipitate is usually a gummy mass comprising sulfonamides, sulfonamide salts and additional contaminants. The utilization of the requisite conditions in an aqueous system of an excess of alkaline metal base in a highly alkaline solution of the order indicated results in a precipitate of the sulfonamide salts in a substantially pure state, which is easily separable by filtration or by any other convenient means from the liquid reaction mixture. These requisite conditions for purification are unique since in general other sulfonamide salts, e. g. alkali metal salts of benzene and toluene sulfonamides are highly soluble in aqueous akali, and consequently may not be purified therefrom in the manner disclosed.

The amount of excess base necessary to obtain the desired precipitate in aqueous systems is variable depending upon the specific character of the reactants, etc. Any suitable excess may be employed however since the desired result is an observable phenomenon and consequently determinable by simple trial. It has been found generally that amounts of base of the order of 50% and 100% excess of the stoichiometric amount theoretically necessary for salt formation yields highly satisfactory results.

In the use of inert non-aqueous systems, equivalent amounts of reactants or an excess of base may be suitably employed. Thus when sodium metal is used as a base in such a system, an equivalent quantity may be employed since the reaction goes to substantial completion because of the evolution of hydrogen.

Thus, any suitable reaction medium may be used if desired. The solvent should be inert and substantially neutral, and preferably is one in which the alkyl aryl sulfonamide salts are insoluble. The most expedient reaction medium is an aqueous system, e. g. water, aqueous acetonitrile, etc., and the alkaline metal base may conveniently be added in the form of an aqueous solution. Inert solvents such as the lower ketones (e. g. acetone), the lower nitriles (e. g. acetonitrile), lower hydrocarbons (e. g. hexane), and lower aliphatic chlorinated hydrocarbons (e. g. ethylene dichloride) may be used also. The sulfonamide salts are insoluble in acetonitrile and the like and consequently are precipitated from such liquid reaction mixtures with facility. With the use of solvents such as chloroform in which the sulfonamide salts are generally soluble, subsequent addition of a suitable solvent such as acetonitrile will cause the sulfonamide salt to precipitate from the chloroform solution.

The precipitated sulfonamide salts may thereafter be separated from the liquid reaction mixture by any means suitable for solid-liquid phase separation, including filtration, gravity, centrifugal force, etc.

The purified sulfonamide salts may be dried, washed, recrystallized or subjected to any other conventional means of purification if desired.

These sulfonamide salts in general are friable, light-colored solids exhibiting a strongly alkaline reaction in aqueous solution. They are dispersable usually in water and possess surface-active properties, particularly in conjunction with other surface-active agents, e. g. anionic synthetic detergents. They are useful in emulsifying, dispersing, textile treating and deterging arts.

The original sulfonamide substances may be regenerated from the sulfonamide salts by treatment with a material having a pH lower than the normal alkalinity of the sulfonamide salt. More particularly, the sulfonamide salts may be reacted with mineral acids such as sulfuric or hydrochloric acid to form the original sulfonamide and inorganic salt which are easily separated by any convenient means. It is within the scope of this invention that the regeneration procedure may be effected during the manufacture of a detergent composition. As disclosed by Gebhart and Krems, U. S. patent application Serial No. 152,521, filed March 28, 1950, these original sulfonamide materials, such as the higher alkyl mononuclear aryl sulfonamide type compounds, are effective additives in anionic synthetic detergent compositions to yield a high level of detersive efficiency and foaming power. Since such detergent compositions generally have pH values in aqueous solutions of less than 11 and usually less than about 10, the addition of minor amounts of sulfonamide salts thereto will be effective to substantially regenerate the sulfonamide compounds. Thus, minor amounts of the alkali metal sulfonamide salts may be mixed with anionic synthetic detergents, e. g. alkyl aryl sulfonates, lauryl sulfates, fatty acid monoglyceride sulfates, etc., with phosphates, e. g. tetrasodium pyrophosphate, sodium tripolyphosphate, sodium sulfate, and various organic and inorganic builders in an aqueous system in a conventional soap crutcher or any other convenient vessel. Since the pH values of the detergent composition is generally less than about 10, the sulfonamide salts are substantially converted to the parent sulfonamide compounds in situ. Thereafter, the compositions may be prepared as solutions, pastes, or in the form of dry or partially hydrated solids in particulate form. It is preferred to heat-dry the aqueous slurries prepared in the crutcher and the like by subjecting them to conventional spray-drying, roll and drum drying, or other appropriate drying operations.

The following examples described hereinafter are additionally illustrative of the present invention and it will be understood that the invention is not limited thereto:

*Example I*

Dodecyl benzene sulfonic acid in which the dodecyl group is derived from a propylene tetramer is used to prepare the corresponding sulfonyl chloride. 586 parts of the sodium salts of these higher alkyl benzene sulfuric acids are mixed intimately with 400 parts of phosphorus pentachloride in a suitable flask. The liquid reaction mixture is heated on a steam bath for 7 hours, cooled, poured into ice, and extracted with benzene. The benzene extract is washed with water, dried over anhydrous calcium sulfate, filtered, and the benzene evaporated from the filtrate to yield the corresponding higher alkyl benzene sulfonyl chloride as a viscous dark brown product in high yield and purity.

The dodecyl benzene sulfonyl chloride reaction product is then treated with an excess of ammonium hydroxide using a 1:1 water-acetone mix as a solvent at room temperature for three hours with stirring. The acetone is evaporated on a steam bath and the oily residue is acidified, neutralized, and extracted with ethyl ether. The ether extract is washed with acid and water till neutral, and then dried with anhydrous sodium sulfate. After removing the ether at 2 mm. vacuum, the corresponding higher alkyl benzene sulfonamides are obtained in 79% yield as an amber colored viscous oil.

11 parts of this crude sulfonamide reaction product is treated with 25 parts of 25% sodium hydroxide. The use of an excess of sodium hydroxide and the consequent development of a pH in solution over 12 produces with evolution of heat almost immediately a yellow-orange solid precipitate which is the corresponding sodium salt of the sulfonamide. The solid salt is filtered from the liquid phase containing an excess of caustic and the soluble impurities, and then dried by evaporation.

The dried salt is washed with an organic solvent such as Skellysolve F. (petroleum ether) to remove any residual oil soluble impurities. The final reaction product is a cream colored solid which gives a strongly alkaline reaction when immersed in water. It is friable in solid form, dispersable in water and has surface-active properties, particularly in conjunction with other surface-active agents. It may be represented by the following structural formula:

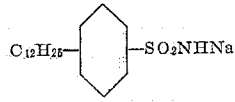

The sulfonamide may be regenerated by treating the sodium salt in water with sulfuric acid. The product may be taken up in benzene and dried azeotropically to yield an odorless straw colored residue after evaporation of the solvent. This residue is the corresponding free dodecyl benzene sulfonamide in 99.23% purity.

*Example II*

The procedure of Example I is repeated using the sodium salt of keryl benzene sulfonic acid to form the corresponding sulfonyl chloride for condensation with ammonia. This keryl benzene product is formed by the chlorination of refined Pennsylvania crudes boiling in the range of 200 to 300° C., followed by condensation of the resulting keryl chloride with benzene using a Friedel-Crafts catalyst, and sulfonation of the resulting product. The average molecular weight of the alkyl chain on the benzene nucleus corresponds to a saturated aliphatic hydrocarbon of about 14 carbon atoms.

*Example III*

Dodecyl benzene sulfonamide is treated with an excess of 25% aqueous caustic soda in acetonitrile. As the pH rises substantially above 10, the orange-yellow solid representing the sodium salt is precipitated easily. The solid phase is filtered and recrystallized from boiling acetone to yield an extremely pure product.

*Example IV*

The salt forming procedure of Example I is repeated using aqueous potassium hydroxide as the alkaline reagent and forming consequently the potassium salt of the higher alkyl aryl sulfonamide.

*Example V*

N-methyl dodecyl benzene sulfonamide is treated with an excess of caustic soda according to the procedure of Example I. The alkaline sodium salt is precipitated, filtered and washed.

*Example VI*

Dodecyl benzene sulfonamide is dissolved in petroleum ether, and an excess of concentrated barium hydroxide aqueous solution is added thereto with stirring. An immediate precipitate is formed which is filtered and represents the corresponding barium salt of dodecyl benzene sulfonamide.

*Example VII*

A 60% solids aqueous slurry containing on a solids basis about 35% sodium propylene tetramer benzene sulfonate, 40% sodium tripolyphosphate, 15% sodium sulfate, and minor amounts of sodium chloride, sodium hydroxide, sodium carboxymethylcellulose, are mixed with 5% of the sodium salt of propylene tetramer benzene sulfonamide. The pH of the resulting mixture is about 9.6 whereby the sulfonamide salt is substantially converted to the free sulfonamide in situ. The slurry is agitated at about 140° F. in a conventional soap crutcher to form a homogeneous composition. This slurry is submitted to spray-drying with air at a temperature of about 350° F. with a resultant moisture loss of about 40%. The resulting composition is recovered in the form of homogeneous beads and possesses a high degree of detersive properties in both hard and soft water.

Although the present invention has been described with reference to particular embodiments and examples, it will be apparent to those skilled in the art that variations and modifications can be substituted therefore without departing from the principles and true spirit of the invention.

Having described the invention, what is desired to be secured by Letters Patent is:

1. A process for the preparation of a higher alkyl nuclear substituted monocyclic aryl hydrocarbon sulfonamide compound which comprises condensing a higher alkyl nuclear substituted aryl sulfonyl halide with a member of the group consisting of ammonia and lower alkyl primary amines to form a crude reaction product comprising a sulfonamide compound from the group consisting of the corresponding higher alkyl substituted aryl primary sulfonamides and N-lower alkyl sulfonamides admixed with undesirable impurities, treating said reaction mixture in an aqueous medium with an excess of a base selected from the group consisting of alkali metal and alkaline earth metal bases releasing hydroxyl ions in water, the amount of said excess base being sufficient to form an aqueous alkaline reaction mixture having a pH above 11 and precipitating substantially all of said sulfonamide compound as the corresponding metal salt from the reaction mixture substantially free from said impurities.

2. A process for the preparation and purification of a higher alkyl nuclear substituted benzene sulfonamide compound which comprises condensing a higher alkyl nuclear substituted benzene sulfonyl halide with ammonia to form a crude reaction product comprising the corresponding higher alkyl substituted benzene primary sulfonamides admixed with undesirable impurities, treating said reaction mixture in an aqueous medium with an excess of caustic alkali, the amount of said excess alkali being sufficient to form an aqueous alkaline reaction mixture having a pH above 11 and precipitating from said reaction mixture substantially all of said sulfonamide compound as the corresponding alkali metal salt substantially free from said impurities, and regenerating said sulfonamide compounds by acidifying said salts to recover said sulfonamide compounds in purified form.

3. In a process for the preparation and purification of a higher alkyl nuclear substituted benzene primary sulfonamide, the steps which comprise condensing a higher alkyl benzene sulfonyl chloride with ammonia to form a crude reaction product comprising said higher alkyl benzene primary sulfonamide admixed with undesirable impurities produced thereby, treating said reaction product in an aqueous medium with an excess of caustic alkali, the amount of said excess being sufficient to form an aqueous alkaline reaction mixture having a pH above 11 and precipitating from said reaction mixture substantially all of said sulfonamide compound as the corresponding alkali metal salt substantially free from said impurities.

4. In a process for the preparation and purification of higher alkyl aryl sulfonamide compounds, the steps which comprise treating an impure sulfonamide compound having the formula:

R—X—SO$_2$NH—Y wherein R is a higher alkyl group, X is a monocyclic aromatic hydrocarbon group and Y is selected from the group consisting of hydrogen and lower alkyl, in an aqueous medium with an excess of base selected from the group consisting of alkali metal bases and alkaline earth metal bases which release hydroxyl ions in water and forming an aqueous alkaline reaction mixture having a pH above 11 and precipitating substantially all of the corresponding salts of said sulfonamide compound in the presence of said excess base, and separating said sulfonamide salt substantially free from impurities.

5. A process for the purification of a higher alkyl nuclear substituted benzene primary sulfonamide which comprises treating said higher alkyl benzene primary sulfonamide in an aqueous medium with an excess of caustic alkali and forming an aqueous alkaline reaction mixture having a pH above 11 and precipitating substantially all of the corresponding alkali metal salt of said sulfonamide compound in the presence of said excess base, and separating said sulfonamide salt substantially free from impurities.

IRVING JOSEPH KREMS.

References Cited in the file of this patent

UNITED STATES PATENTS

| Number | Name | Date |
|---|---|---|
| 2,106,244 | De Groote | Jan. 25, 1938 |
| 2,132,178 | Mietzsch et al. | Oct. 4, 1938 |
| 2,287,639 | Pings | June 23, 1942 |
| 2,292,997 | Hentrich et al. | Aug. 11, 1942 |
| 2,341,614 | Hentrich et al. | Feb. 15, 1944 |
| 2,344,978 | De Groote et al. | Mar. 28, 1944 |
| 2,345,121 | Hentrich et al. | Mar. 28, 1944 |
| 2,374,934 | Hentrich et al. | May 1, 1945 |
| 2,383,859 | Hentrich et al. | Aug. 28, 1945 |
| 2,395,105 | Cook et al. | Feb. 19, 1946 |

FOREIGN PATENTS

| Number | Country | Date |
|---|---|---|
| 848 | Great Britain | Nov. 12, 1903 |
| 6,198 | Great Britain | Dec. 1, 1894 |
| 77,435 | Germany | Oct. 2, 1894 |
| 336,615 | Germany | May 13, 1921 |
| 489,845 | Germany | Jan. 22, 1930 |
| 874,768 | France | May 18, 1942 |